(12) United States Patent
Miller et al.

(10) Patent No.: US 6,174,938 B1
(45) Date of Patent: *Jan. 16, 2001

(54) WATER-BASED COLORING COMPOSITIONS CONTAINING SUBMICRON POLYMERIC PARTICLES

(75) Inventors: Richard E. Miller, Palm Coast, FL (US); Andree F. Santini, Easton; Terry L. Sutton, Sr., Nazareth, both of PA (US)

(73) Assignee: Binney & Smith Inc., Easton, PA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/316,464

(22) Filed: May 21, 1999

(51) Int. Cl.[7] .................................................... C09D 11/16
(52) U.S. Cl. .................... 523/164; 106/31.25; 106/31.71
(58) Field of Search .................................... 523/160, 161, 523/164; 428/402, 402.21, 402.22, 403; 106/31.25, 31.65, 31.71, 31.6; 524/421

(56) References Cited

U.S. PATENT DOCUMENTS

| | | |
|---|---|---|
| 4,252,601 | 2/1981 | Ceintrey . |
| 4,409,353 * | 10/1983 | Umekawa et al. .................... 524/421 |
| 4,880,465 | 11/1989 | Loria et al. . |
| 4,942,185 | 7/1990 | Inoue et al. . |
| 4,954,174 | 9/1990 | Imagawa . |
| 5,116,410 * | 5/1992 | Miller ..................... 106/22 |
| 5,120,359 | 6/1992 | Uzukawa et al. . |
| 5,120,360 | 6/1992 | Tajiri et al. . |
| 5,294,664 | 3/1994 | Morrison, Jr. et al. . |
| 5,334,649 | 8/1994 | Fujita . |
| 5,484,677 * | 1/1996 | Inaba ..................................... 430/110 |
| 5,510,397 | 4/1996 | Okuda et al. . |
| 5,510,415 | 4/1996 | Zahrobsky et al. . |
| 5,716,217 | 2/1998 | Imagawa et al. . |
| 5,746,818 | 5/1998 | Yatake . |
| 5,886,079 | 3/1999 | Saibara et al. . |
| 5,968,241 * | 10/1999 | Santini et al. .................... 106/31.32 |

FOREIGN PATENT DOCUMENTS 63-273679   11/1988   (JP) .

OTHER PUBLICATIONS

Day–Glo Technical Bulletin, Splash Colors™, SPL–N (New) Fine Grind Fluorescent Pigment Dispersions, Day–Glo Color Corp.

Day–Glo Technical Bulletin, Echo Colors™, Extra Strength Ultra Fine Grind Fluorescent Pigment Dispersions, Day–Glo Color Corp.

* cited by examiner

*Primary Examiner*—Edward J. Cain
*Assistant Examiner*—Katarzyna Wyrozebski
(74) *Attorney, Agent, or Firm*—Leydig, Voit & Mayer, Ltd.

(57) ABSTRACT

A water-based coloring composition suitable for use in children's markers comprising a carrier, submicron polymeric particles, and a neutral buoyancy additive. The coloring compositions produce unique opaque images on a wide variety of writing surfaces. Additionally, the invention includes a water-based dry erase coloring composition suitable for use in children's markers comprising a carrier, submicron polymeric particles, a neutral buoyancy additive, and a release agent.

25 Claims, No Drawings

WATER-BASED COLORING COMPOSITIONS CONTAINING SUBMICRON POLYMERIC PARTICLES

FIELD OF THE INVENTION

The present invention relates generally to the field of water-based coloring compositions for drawing and coloring purposes. Water-based coloring compositions are provided which produce vivid images on a wide variety of writing surfaces. In one particular aspect, the invention relates to formulations of coloring compositions for use in markers, which are especially suitable for use by children.

BACKGROUND OF THE INVENTION

The use of opacifiers to enhance the appearance and visibility of coloring compositions is well known. When coloring compositions containing an opacifier are applied to opaque surfaces (e.g., paper, walls, whiteboards, etc.), the opacifier brightens and intensifies the images produced by the composition. When coloring compositions containing an opacifier are applied to transparent surfaces, the opacifier enhances the visibility of the writings through increased light scattering. Inorganic pigments, such as titanium dioxide, have commonly been used in paints as an opacifier.

Coloring compositions containing a conventional opacifier, however, suffer from a variety of well-known deficiencies that render them unsuitable for use in children's coloring markers. Conventional opacifiers settle-out over time causing writing instruments to clog and resulting in unacceptable variation in the writings. Although valve-type marker systems containing an agitator ball allow the user to redisperse the settled particles, such non-conventional markers are significantly more expensive and cumbersome than traditional capillary delivery systems. The inclusion of thickeners to counteract this settling produces compositions having an unsatisfactory viscosity that cannot be dispensed through capillary-type markers. Finally, opaque inks containing pigments and other resins sometimes render the compositions permanent which is not appropriate for a coloring product primarily used by children who often make stray marks on themselves and surrounding surfaces. As a result of these inadequacies, coloring markers containing conventional opacifiers have not been produced with great success.

Further, even when traditional marker inks containing dyes are stable when stored either tip up or tip down, they produce markings that are transparent when dry. Consequently, writings on transparent surfaces (e.g., windows) or colored paper are difficult to see upon drying.

It is therefore one general object of the invention to provide a water-based coloring composition suitable for use in markers which produces images exhibiting enhanced visibility and stability, suitable for writing on porous and non-porous surfaces.

A further object is to provide water-based coloring compositions which exhibit enhanced visibility and stability on transparent and colored writing surfaces.

A further object is to provide non-toxic coloring compositions which are suitable for use by young children who may make marks on themselves and their clothing.

A related object of the invention is to provide a dry erase coloring composition suitable for use on windows, writing boards, whiteboards and other non-porous surfaces.

These and other objects and advantages of the present invention, as well as additional inventive features, will be apparent to those skilled in the art from the following description of the invention and the appended claims.

BRIEF SUMMARY OF THE INVENTION

The present invention provides a water-based coloring composition suitable for use in markers and, in particular, children's markers. The water-based coloring composition comprises a carrier, submicron polymeric particles, and a neutral buoyancy additive. The carrier in the coloring composition of the present invention is water.

In another form, the invention is a water-based dry erase coloring composition comprising a carrier, submicron polymeric particles, a neutral buoyancy additive, and a release agent. The carrier in the dry erase coloring composition of the invention is water.

DETAILED DESCRIPTION

The present invention advantageously incorporates submicron polymeric particles and a neutral buoyancy additive into a water-based coloring composition to produce writings having a unique opaque effect when dried. The coloring compositions of the present invention have a superior visual appeal which makes them suitable for use in a wide variety of applications.

The carrier component of the inventive coloring composition is water. Preferably, the water used in the present invention is deionized water. Advantageously, the use of water as a carrier yields compositions that have a very low toxicity and a negligible irritant smell. Minor amounts of other liquid components may be present in the carrier, but these components should not significantly impact the toxicity of the inventive coloring compositions. Other liquid components which may be present in the carrier include, for example, ammonia and alcohol. The carrier is present in an amount sufficient to form a suspension of the other components in the composition.

The maximum amount of water used is an amount which results in a stable composition and which is capable of forming a mark having the minimum acceptable visibility on a substrate. The minimum amount of water is that amount necessary to form a stable suspension of the components of the coloring composition and provide a composition which can be freely dispensed from the selected dispensing element. The remaining components must be dispersible in water. The proportion of carrier contemplated herein is from about 15% to about 97% by weight of the total coloring composition of the present invention. The carrier is preferably present in an amount of from about 20% to about 80% and, most preferably, in an amount of from about 40% to about 75%. Some or all of the carrier may be contributed by water found as a portion of one or more other components.

In addition to the carrier, the coloring compositions of the present invention include an opacifier. Opacifiers are used to modify and enhance the visual impact of a product and give such products a uniform opaque appearance. This visual appeal allows the inventive coloring compositions to be available in a wide variety of formulations for use in many different applications. Specifically, an opacifier is believed to function as a light-scattering agent to reduce the transparency of the coloring compositions. The extent of visibility of a particular opacifier depends upon the geometry and refractive index of the opacifier particles as compared to the refractive index of the medium light travels through (i.e., air). By incorporating an opacifier into a coloring composition, the images generated appear more visible because light reflects off the opacifier toward the viewer's eye rather than passing through the image.

The opacifiers used in the present coloring compositions are submicron polymeric particles. Suitable polymeric particles may have any shape including, but not limited to, spheres, rods, cylinders, cubes and other non-uniform shapes. In the contest of the present invention, spherical submicron particles are referred to as microspheres. Mixtures of submicron polymeric particles having different shapes may also be used. Further, the polymeric particles may be solid or hollow. Mixtures of solid and hollow particles can also be used. Hollow polymeric microspheres generally have an outer polymeric shell and an inner hollow region.

The submicron polymeric particles may be made of virtually any organic polymer and may be either thermoplastic or thermosetting. Useful thermoplastic resins for forming microspheres include cellulose derivatives, acrylic resins, polyolefins, polyamides, polycarbonates, polystyrene, copolymers of styrene and other vinyl monomers, vinyl polymers such as homo- or copolymers of vinyl acetate, vinyl alcohol, vinyl chloride, vinyl butyral, and homo- and copolymers of dienes. Particularly useful are copolymers of styrene and other vinyl monomers. Acrylic-styrene copolymers are most preferred. The polymeric particles may also comprise suitable thermosetting resins including hydroxyl esters of ethylenically-unsaturated monomers which are typically admixed with a crosslinking agent or admixtures of alkyl resins which may be employed with cross-linking agents.

The submicron polymeric particles useful in the present invention may be obtained from commercial sources. Polymeric microspheres are known in the art and may be obtained from a variety of sources. Suitable solid polymeric microspheres include, for example, Opacifier 653, marketed by Morton International, Inc., which is a water-based, styrene/acrylic emulsion containing about 48% by weight microspheres, and Plastic Pigment 730NA, marketed by The Dow Chemical Company, which is an aqueous dispersion of carboxylated styrene polymers containing about 51–53% by weight microspheres. Polystyrene microspheres sold under the tradename Lytron™, marketed by GenCorp, are also acceptable. Alternatively, Ropaque™ OP-96 polymer is a commercially available product containing hollow polymeric microspheres marketed by Rohm and Haas Company. Ropaque™ OP-96 is supplied in the form of an aqueous emulsion containing about 30% by weight (about 50% by volume) of hollow microspheres made of an acrylic-styrene copolymer. Mixtures of solid and hollow polymeric microspheres may also be used in the present invention.

Useful submicron polymeric particles may be modified with traditional dyes, pigments, or other materials to provide a coloring composition that exhibits a unique appearance (e.g., fluorescent, opalescent, metallic, etc.). For example, dyes can be incorporated into the submicron polymeric particles during the manufacture of such polymeric particles. Examples of modified polymeric particles include fluorescent pigments marketed by Day-Glo Color Corporation under the tradenames Splash Colors™ SPL-N and Echo Colors™ ECX. Both Day-Glo™ SPL-N and Day-Glo™ ECX fluorescent pigment particles are supplied as dispersions having a specific gravity of about 1.0–1.1. Day-Glo™ SPL-N dispersions are supplied as 46–50% solids with a particle size range of 0.25–0.40 microns. Day-Glo™ ECX dispersions are supplied as 42–46% solids with a particle size range of less than 0.20 microns. Modified submicron polymeric particles may be mixed with other submicron polymeric particles, such as microspheres, to produce coloring compositions that produce unique images.

The amount of submicron polymeric particles present in the inventive coloring compositions is dependent upon the desired visual effect. Generally, polymeric particles are present in an amount of from about 5% to about 90% by weight of the coloring composition. Preferably, the submicron polymeric particle component is present in amount of from about 5% to about 80% by weight of the coloring composition and, most preferably, in an amount of from about 7.5% to about 40%. Where the Ropaque™ OP-96 emulsion of polymeric microspheres is selected as the polymeric particle component, it is present in a concentration of from about 15% to about 80% by weight of the coloring composition and, preferably, in an amount of from about 30% to about 60%.

The particle size of polymeric particles suitable for use in the present coloring compositions may vary. In the form of microspheres the polymeric particles have a diameter of from about 0.1 to about 1.0 microns and, preferably, from about 0.2 to about 0.6 microns. With respect to non-uniform polymeric particles, the length of the largest internal diameter of such particles is from about 0.1 to about 1.0 microns and, preferably, from about 0.2 to about 0.6 microns.

Hollow polymeric particles possess the ability to hold water which can diffuse from the inner hollow region of the particle out through the outer polymeric shell. The source of this water may be either water present in the carrier component of the inventive coloring composition or water present in the aqueous emulsion in which the submicron polymeric particles are often commercially supplied.

Submicron polymeric particles may function as both light-scattering agents and as colorants. The use of submicron polymeric particles without the presence of additional dyes or pigments may produce a white coloring composition. Advantageously, the submicron polymeric particles may be dyed to simultaneously provide both color and opacity to the inventive coloring compositions.

Solid polymeric particles advantageously provide wet opacity. That is, solid particles are immediately visible when markings are made on a writing surface with the inventive coloring composition, even while the markings are still wet. This feature is beneficial in children's coloring composition.

With respect to hollow submicron polymeric particles, any water contained within the inner region of hollow particles eventually evaporates after the application of the coloring composition to a suitable substrate. The outer polymeric shell and air within the inner hollow region provide submicron particles having unique light scattering properties.

Submicron polymeric particles may be obtained by any suitable method including standard orifice or surface polymerization methods. Hollow microspheres may be produced, for example, by the method described in U.S. Pat. No. 4,089,800.

The coloring compositions of the invention also include a neutral buoyancy additive. The neutral buoyancy additive is included to prevent the submicron polymeric particles from settling out of the coloring composition and is critical to the stability of the present compositions. To prevent settling, the water-based carrier in which the polymeric particles are suspended must have a specific gravity about equal to or greater than the specific gravity of the polymeric particles. Under this condition, the polymeric particles do not have a tendency to settle out of the dispersion or suspension. Thus, the quality of the coloring composition remains uniform even after it has been stored on a shelf for a significant period of time. Importantly, the neutral buoyancy additive eliminates the necessity for (1) filtration of the composition before inclusion in marker systems and (2) mechanical agitation prior to the use of the present coloring composition following storage.

Any additive which is sufficient to raise the specific gravity of the coloring composition may be used. For example, water-soluble inorganic salts and water-soluble organic compounds such as organic salts (e.g., sodium carbonate), sugars (e.g., sucrose), starches, and glycerins are appropriate neutral buoyancy components. Preferred water-soluble inorganic salts include sodium sulfate, sodium chloride, sodium phosphate and potassium chloride. Sulfates, chlorides, carbonates, and phosphates may be utilized in either anhydrous or hydrated (e.g., $Na_2SO_4.10 H_2O$) forms. The neutral buoyancy additive should be compatible with colorants and other components of the coloring composition. Surprisingly, it has been found that the presence of a water-soluble salt as the neutral buoyancy additive does not cause deterioration or corrosion of either the submicron polymeric particles or the optional colorant (e.g., dyes or pigments) contained in the inventive coloring composition. The neutral buoyancy additive may be added to the coloring composition in a solid state or dissolved in an aqueous solution.

The minimum amount of neutral buoyancy additive present is governed by its function as a stabilizer of the inventive coloring compositions. That is, the neutral buoyancy additive should be present in an amount sufficient to raise the specific gravity of the coloring composition which inhibits the submicron polymeric particles from settling out. The maximum amount of the neutral buoyancy additive is limited by the flow characteristics of the inventive coloring composition. The viscosity of the coloring composition containing a neutral buoyancy additive should not significantly restrict the ability of the inventive coloring composition to flow from the reservoir through the nib of conventional capillary markers. On the other hand, the neutral buoyancy additive should produce a coloring composition having a sufficiently high viscosity so that the inventive composition remains stable during storage. Accordingly, the preferred concentration range of the neutral buoyancy additive is from about 0.5% to about 30% by weight of the coloring composition. When a salt is used as the neutral buoyancy additive, it is preferably present in an amount of from about 0.5% to about 10% by weight of the coloring composition.

In general, the coloring composition of the present invention has a density similar to the density of the submicron polymeric particles. The inventive composition generally has a density of from about 8.0 lbs/gal to about 9.0 lbs/gal and, preferably, a density of from about 8.5 lbs/gal to about 8.8 lbs/gal. With respect to viscosity, the inventive coloring composition has a viscosity of from about 1 to about 20 centipoises. Preferably, the composition has a viscosity of from about 2 to about 10 centipoises and, more preferably, from about 3 to about 6 centipoises.

Other colorants may be used in addition to the submicron polymeric particles. The use of colorants in present coloring compositions allows consumers to advantageously produce a wide variety of colored writings having an unique opaque visual effect. Suitable colorants include dyes or pigments which are preferably selected based upon their launderability from fabrics and washability from skin. Additionally, the colorants used should be both easily dispersed within the composition and compatible with the other components.

One type of suitable colorant for use in compositions of the present invention are acid dyes. By way of illustration, and not in limitation, acid dyes that have been found suitable for use in this invention are Acid Violet 12, Acid Green 3, Acid Blue 9, Acid Yellow 17, Acid Yellow 23, Acid Red 52 and Acid Red 388. Red FD&C 40 and Yellow FD&C 5 and 6 may also be used.

Another category of suitable colorants for use in the present invention is polymeric dyes. Polymeric dyes are characterized as having polymeric chains covalently bonded to a chromophore molecule. By way of illustration, and not limitation, polymeric dyes suitable for use in compositions of the invention include Palmer Scarlet™, Palmer Blue™, Palmer Magenta™, and Experimental Palmer FL Red A 10™. These polymeric dyes are commercially available from Milliken Chemical and may be covered by one or more of U.S. Pat. Nos. 4,981,516, 5,043,013, and 5,059,244, the disclosures of which are incorporated herein by reference. Other polymeric dyes useful in the practice of the invention include polyalkyleneoxy-substituted chromophore compounds such as, for example, alkyleneoxy-substituted methine colorants. The use of polymeric dyes permits the compositions of the present invention to be more easily washed off or more thoroughly removed from writing surfaces.

Another type of colorant suitable for use in the coloring compositions of the present invention is pigments. The amount of suitable pigments included is determined by the ability to maintain a stable composition without the need for mechanical agitation. Examples of such suitable pigments include organic pigments such as carbon black, phthalocyanines (e.g., copper phthalocyanine blue), azo pigments, quinacridones, anthraquinones, dioxazines, indios, thioindios, perynones, perylenes, indolenones and azo-azomethines. Fluorescent pigments and encapsulated pigments may also be utilized. Other pigments including, for example, inorganic pigments in ultrafine encapsulated or modified form, are likewise suitable for use.

To achieve good coloring and promote compatibility with the remaining components, the pigment may be utilized in the form of an aqueous dispersion, inasmuch as pigments are by definition insoluble materials. Pigment dispersions are commercially available which are combinations of a pigment, an aqueous based carrier, one or more resins, and a surfactant or dispersant system. A pigment dispersion may also be prepared specifically for use in the coloring compositions of the invention. From the standpoint of convenience, a commercial pigment dispersion is preferred for use in the present invention. Typical commercial dispersions contain 30 to 74% by weight active pigment ingredients. Examples of suitable pigment dispersions include Hostafine Rubine F6B (C.I. Pigment Red 184 dispersion), Blue B2G (Pigment Blue 15-3), Black T (Pigment Black 7), and Yellow GR (C.I. Pigment Yellow 13) marketed by Clariant Corporation under the tradename "Hostafine Dispersions." Pigments may optionally be used in the inventive coloring composition in any concentration necessary to give the desired color effect provided that the pigment does not raise the viscosity of the composition to an unacceptable level. The typical concentration of the coloring composition of the present invention containing a pigment colorant is from about 0.1% to about 10% by weight of the coloring composition.

The coloring compositions of the invention may optionally contain polymeric dyes, acid dyes, pigments, or mixtures thereof. Additionally, the compositions may contain two or more polymeric dyes, two or more acid dyes, or two or more pigments to achieve the desired color. When colorant is added, it is preferably present in an amount up to about 20% by weight of the total coloring composition of the invention. The minimum concentration of colorant which will produce a workable coloring composition is governed by the color intensity desired, though as little as 0.1% colorant may be sufficient for certain applications. The maximum workable concentration of colorant is determined largely by the ability to maintain a stable composition, and can vary widely depending upon the concentration of other components. The maximum amount of colorant is also a function of the characteristics of the desired end product, though a practical upper limit in the formulation of the composition of the invention as, for example, a marker ink, is about 30% by weight of the total coloring composition of the invention.

The use of a neutral buoyancy additive may have a destabilizing effect on the dispersion of microspheres and other components in the water-based carrier. Thus, the present coloring composition may optionally contain a dispersant which may aid stabilization of the dispersion. Suitable dispersants include both anionic and cationic dispersants. Although not so limited, the dispersant may produce colloidal stability by preventing flocculation of the components during long-term storage. A preferred dispersant is Tamol™ 731 marketed by the Rohm and Haas Company and commercially supplied as an aqueous solution of the dispersant containing about 25% by weight of the dispersant component. The dispersant is usually effective when present in any amount, but generally is present in an amount of from about 0.1% to about 10% by weight of the total coloring composition.

It is desirable for the coloring compositions of the present invention to exhibit enhanced fugitivity from both fabrics and skin. The ability of the present compositions to be easily removable from fabrics and skin makes then especially suitable for use by children. Accordingly, the inventive coloring compositions may optionally contain a dyeblocker component or another washability-aid component besides a dyeblocker to impart skin fugitivity and, in some instances, enhanced fabric fugitivity to the present compositions.

Many substances may suitably perform as a dyeblocker. For example, anionic materials, such as, surfactants or polymers, which contain reactive functional groups, such as, for example, acid groups, may be used. Although the present invention is in no way limited to a mechanism by which dyeblockers operate, it is believed that the acid groups in these anionic materials react with dye-receptor sites present in the skin, fabrics, and other surfaces to form a barrier to dye receptors. Suitable anionic dyeblockers include any straight chain or aromatic compound containing, for example, highly reactive carboxylic, sulfonic, or nitric groups which possibly react with dye-receptor cites such as, for example, amino groups that are commonly present on skin, some types of fabrics, and other surfaces. Preferably, the anionic dyeblocker is an aromatic organic sulfonate. One group of preferred aromatic organic sulfonate dyeblockers are sulfonated phenol-formaldehyde condensation products, sulfonated naphthalene condensation products, or mixtures thereof. The dyeblockers useful in the practice of the present invention do not impair the stability of the coloring compositions of the invention. By stability, it is meant that the coloring composition, which includes the condensation product additive, must not precipitate nor exhibit a marked change in color or pH when maintained at a temperature of 140° F. for two weeks. Preferably, dyeblockers selected for use in the invention, in addition to imparting fugitivity from skin, also enhance fugitivity from textiles and other surfaces. Suitable dyeblockers may often be film-forming, which may further prevent the migration of dyes toward the reactive sites of a substrate, thereby reducing staining.

Sulfonated phenol-formaldehyde condensation product dyeblockers useful in the practice of the invention are described in U.S. Pat. No. 4,501,591. Suitable sulfonated phenol-formaldehyde condensation products may be, but are not limited to, linear, low molecular weight condensation products; that is products having an average molecular weight of less than about 1000, for example, in the range of 250 to 700. Such products are water-soluble and may be prepared by conventional art-recognized techniques, for example, by condensation of formaldehyde with one or more phenols in a mole ratio of about 1.0 to 0.8, phenol(s) to formaldehyde, at a pH of less than 7 using an acid catalyst such as HCl, wherein at least one of the phenols is a phenolsulfonic acid or alkali metal salt thereof. Preferably, the phenols comprise, in addition to the sulfonic acid or salt thereof, a sulfone, for example, dihydroxy aromatic diphenol sulfone. Such condensation products contain, in addition to sulfonic acid groups or alkali metal salts thereof, sulfone groups. Other sulfonated phenol-formaldehyde condensation products are described in U.S. Pat. No. Re. 33,365, and U.S. Pat. Nos. 4,908,149, 4,592,940 and 4,680,212.

One sulfonated phenol-formaldehyde condensation product dyeblocker suitable for use in compositions of the invention is Aerofix N™, commercially available from Aerochem Corporation. Aerofix N™ is supplied as an aqueous solution of the phenol-formaldehyde condensation product containing about 17% by weight active condensation product ingredient. Other sulfonated phenol-formaldehyde condensation products suitable for use in the compositions of the invention are Intratex N™ available from Crompton and Knowles Corporation (dispersion containing about 18% by weight active condensation product ingredient), and Gascofix NY™ available from GCI Technologies, Inc. (dispersion containing about 29% by weight active condensation product ingredient). Compatible mixtures of these sulfonated phenol-formaldehyde condensation products may also be used. The sulfonated phenol-formaldehyde condensation product, Aerofix N™, is a preferred dyeblocker for use in compositions of the invention. Aerofix N™ may dramatically enhance skin washability and fabric launderability in compositions of the invention. Other sulfonated phenol-formaldehyde condensation products may produce equivalent, or even better, results and are within the scope of the invention.

A sulfonated naphthalene condensation product dyeblocker suitable for use in coloring compositions of the invention is Tamol SN™. Tamol SN™ is commercially available from Rohm and Haas and is supplied in solid form containing 100% by weight active ingredient. Other sulfonated naphthalene condensation products may produce equivalent, or even better, results and are within the scope of the invention. The various dyeblockers discussed above may be used alone or in combination where the dyeblockers are compatible with one another.

Other suitable dyeblockers for the coloring composition of the invention are anionic surfactants. One such suitable anionic surfactant is Dowfax 8390™ which is commercially available from Dow Chemical Co. Dowfax 8390™ is an alkylated diphenyloxide disulfonate and, more specifically, it is disodium hexadecyldiphenyloxide disulfonate (15–35%) and disodium dihexadecyldiphenyloxide disulfonate (5–10%).

The specific mechanism by which the dyeblocker additive imparts skin fugitivity and enhances fabric fugitivity is not known. However, it is believed that the condensation products tie up the reactive sites of the substrates to which coloring compositions containing the dyeblocker are applied. The colorant used in compositions of the invention that also contain a dyeblocker then has a reduced ability to physically or chemically associate with the substrate, be it skin or fabric.

The amount of dyeblocker additive present in the coloring compositions of the invention depends upon the specific condensation product used. The presence of the condensation product in an amount as little as about 1% by weight of the active condensation product ingredient in the total coloring composition may impart enhanced skin, fabric, and surface fugitivity. Even greater washability may be achieved when about 3.5% by weight of the active sulfonated phenol-formaldehyde condensation product ingredient is used where the dyeblocker additive is Aerofix N™. In general, a greater amount of condensation product additive present in the coloring composition should lead to better washability from fabric, skin and other surfaces. However, at a certain point, the addition of more condensation product may not yield any improvement in the washability of the composition. The upper limit of the dyeblocker additive concentration may also be imposed by constraints on the viscosity and the long term stability of compositions of the invention. For example, the coloring composition cannot have a significantly viscous consistency or it will not flow through a marker nib when used in the form of a marker ink.

Accordingly, when the optional dyeblocker components is added, its concentration is preferably in an amount of from about 2% to about 15% by weight of the total coloring composition. Where Aerofix N™ is the selected dyeblocker, it is present in an amount of from about 5% to about 60% by weight of the Aerofix N™ solution based on the total coloring composition of the invention.

In one embodiment, the coloring compositions of the present invention are "wet erase" compositions. That is, dry marks made on non-porous surfaces can generally be effectively removed only with a damp cloth. "Wet erase" compositions are useful for many decorative applications, such as window writing, coloring on plastic films, and tile decorating, where inadvertent removal of the markings by rubbing does not occur.

In an alternative embodiment, the present compositions are rendered "dry erase" through the addition of a release agent. "Dry erase" compositions can be easily removed with a dry cloth or tissue. Where the coloring compositions of the invention are to be used to create marks on a window, the release agent itself forms a separating film between the window or other non-porous surface and the remaining components of the coloring composition. Thus, the markings do not dry on the writing surface, but instead on top of the release agent. As a result, the coloring composition containing a release agent may be erased with a dry cloth or other dry eraser.

Typical release agents include, but are not limited to, siloxanes, such as polydimethylsiloxanes; polyethylene glycols; monobasic higher fatty carboxylic acid esters; mono- or diesters of dihydric alcohols, wherein the ester has a molecular weight of 100 or more; fatty acid triglycerides; higher hydrocarbons such as paraffin and squalene; polyesters and polyethers having molecular weights of 400 or more; and esters of a polycarboxylic acid with an alcohol. The preferred release agent is DCQ43667™ marketed by Dow Corning. Other useful release agents include, but are not limited to, polyalkylene oxide-modified polydimethylsiloxanes sold under the trade name Silwet L-7230™, Silwet L-7607™, and Silwet L-7608™ marketed by OSi Specialties, Inc., FF400™ marketed by Dow Corning, Carbowax Polyethylene Glycol 1450 marketed by Union Carbide, and Lipopeg 4L™ marketed by Lipo Chemicals Inc. Mixtures of these release agents may also utilized in the dry erase coloring compositions of the present invention.

Alternatively, dry erase formulations of the present coloring compositions may be obtained through the addition of a glassy, non-film forming resin. The presence of a glassy, non-film forming resin causes the coloring composition to dry in the form of a chalk-like, non-coalesced film which can be easily erased. An example of a glassy, non-film forming resin is Rhoplex B-85™ marketed by Rohm and Haas.

The release agent contained in the erasable whiteboard marker ink composition may optionally be present in an amount of from about 2% to about 30% by weight of the total coloring composition and, preferably, in an amount of from about 5% to about 15% by weight of the total coloring composition. When formulating dry erase coloring compositions of the present invention, the release agent should, at a minimum, be present in an adequate amount to produce compositions that can be easily erased from non-porous writing surfaces. However, when excessive amounts of release agent are used, the present composition may have an excessively high viscosity which renders the composition unsuitable for use in conventional markers.

Coloring compositions of the present invention may also advantageously contain a humectant, a surfactant, a preservative, a defoamer, and/or a pH regulant. These materials and their functions are well known, and their mention here is by way of illustration only. Generally, any effective amount of the additive may be used so long as the stability of the coloring composition is not adversely affected and the composition is suitable for use in the desired end product.

For example, it may be possible to include a humectant to retard the evaporation of water from the ink solution. This avoids unduly rapid drying of the composition in the marker nib which can cause clogging of the nib and impair the function of the marker. Further, a humectant may improve freeze/thaw stability of the inventive compositions. Typical humectants include polyhydric alcohols such as glycerin, propylene glycol, ethylene glycol, and diethylene glycol, hydroxylated starches, low molecular weight (m.w.= 200–400) poly(ethylene glycols), and mixtures of these materials. Any effective amount of humectant may be used although a generally useful concentration range for these humectants is from about 5% up to about 30% by weight of the coloring composition.

Surfactants in any effective amount (generally up to about 0.5% by weight) may also be included in the coloring compositions of the invention for the purpose of adjusting such properties as viscosity (for proper dispensing of the composition through the nib), and surface tension (for good flow properties and nonporous surface wetting). Anionic surfactants, nonionic surfactants, such as poly (ethylene glycol) ether, alkylaryl polyether alcohol, fluorinated alkyl esters, and mixtures of such materials are preferred for use in the compositions of the invention. Preferred surfactants include Triton X-200™ manufactured by Union Carbide Chemicals and Plastics Company, Rhodapex EST30™ manufactured by Rhodia, and FC120 manufactured by 3M. Mixtures of these surfactants can also be used.

Preservatives of conventional types are also advantageously employed in the compositions of the invention to extend the shelf life of the composition. The preservative preferably serves as both a bactericide and a fungicide. Some typical preservatives useful in the present invention include methyl p-hydroxybenzoate, glutaraldehyde, hydroxybenzoic acid esters, 3-iodo-2-propynyl butyl carbamate, bicyclic oxazolidones, and a biocide comprising as the active ingredients 5-chloro-2-methyl-4-isothiazolin-3-one and, 2-methyl-4-isothiazolin-3-one. Preservatives are usually effective when present in any effective amount but generally are present in amounts of from about 0.1% up to about 1% by weight. Preferred preservatives include Kathon PFM™ (isothiazolinones) manufactured by Rohm and Haas, and Nuosept 95™ bicyclic oxazolidines solutions) manufactured by Huls America.

The pH of the coloring compositions of the present invention is preferably in the range of about 3.0 to about 10.0, more preferably about 7.0 to about 9.5. To maintain this pH, a pH regulant may be employed. Preferably, ammonium hydroxide is used as a pH regulant. Other suitable pH regulants are neutralized versene and AMP 95™, an amine compound marketed by Angus. The pH regulant may be added in an amount ranging from about 0% to about 20% by weight.

The coloring compositions of the present invention may also contain a defoamer to prevent foaming during mixture of the various components. Suitable defoamers include silicones and siloxanes. The preferred defoamer is Tego Foamax 800™ marketed by Goldschmidt Chemical Corp. Other suitable defoamers include Zerofome AF-200™ marketed by NuTech Corp., Surfynol DF58™ marketed by Air Products, and Foamaster H™ marketed by Henkel. The addition of defoamer to the coloring compositions of the present invention does not adversely affect either the stability or fugitivity from skin or fabrics of these compositions. The amount of defoamer depends upon the amounts of other components present in the coloring composition, although typically about 0.1% to about 5% by weight of the coloring composition is used.

The inventive coloring compositions in either wet erase or dry erase (i.e., containing a release agent) formulations may be supplied in any suitable delivery system, such as a marking instrument, to enable children or other consumers to color or draw on non-porous or impervious surfaces as well as porous writing surfaces. Non-porous surfaces do not allow liquids to pass through due to a lack of pores. Exemplary non-porous surfaces include glass, windows, mirrors, plastics, resins, whiteboards, overhead projector films, ceramic tiles, sealed papers and cardboards, metals (e.g., stainless steel), some painted surfaces, and sealed wood. Additionally, the present compositions may be used on porous surfaces including, but not limited to, paper.

Preferably, the marking instrument is a marking pen comprising a conventional marker. Suitable nibs for use in such marking pens are bonded fiber or sintered plastic nibs. The diameter of the nib pores should be sufficient to permit the inventive coloring compositions to be evenly applied to the writing surface. The marking instrument includes a reservoir which holds the coloring composition constructed of, for example, acetate, polyester, polypropylene fibers, or a fiberless system. The use of capillary-type systems for delivery of the inventive coloring compositions allows children to write with the tip end up (i.e., the tip of the marker is oriented higher than the marker body) and eliminates the need for shaking to redisperse components that may have settled.

The coloring compositions of the present invention may be prepared in any suitable manner. For example, the water-based carrier, submicron polymeric particles and neutral buoyancy additive along with the other optional components (i.e., colorants, release agent, etc.) may be added to a suitable vessel and mixed until a suitable dispersion is obtained. Alternatively, one or more of the components, such as the neutral buoyancy additive, may be dissolved or dispersed in an aqueous solution and then mixed with the remaining components.

EXAMPLES

Examples of the coloring compositions of the present invention are as follows. These examples further illustrate the present invention but, of course, should not be construed as limiting its scope in any way. Quantities are given in percent by weight of the total coloring composition. These example compositions may be suitable for use in marking on a variety of non-porous and porous writing surfaces including, for example, whiteboards, windows, glass plates, acrylic boards, and colored paper.

Different coloring compositions were prepared using water, submicron polymeric particles, and a neutral buoyancy additive. Wet erase formulations are illustrated in Examples 1–10 and dry erase formulations containing a release agent are illustrated in Examples 11–13. More particularly, Examples 1–5 and 11–12 contain submicron polymeric microspheres, Examples 6–8 and 13 contain hollow submicron polymeric microspheres, and Examples 9–10 contain mixtures of solid and hollow microspheres.

EXAMPLE 1

Violet

| Component | wt. % |
| --- | --- |
| Deionized Water (dye vehicle) | 37.62 |
| Palmer Magenta (Milliken) (colorant) | 10.00 |
| Sodium Sulfate (anhydrous) (neutral buoyancy additive) | 2.00 |
| Morton 653 (polymeric microspheres) | 50.00 |
| Preservatives/Humectants | 0.38 |

EXAMPLE 2

White

| Component | wt. % |
| --- | --- |
| Deionized Water (dye vehicle) | 30.37 |
| Kathon PFM (preservative) | 0.08 |
| Nuosept 95 (preservative) | 0.30 |
| AMP 95 (pH regulant) | 0.50 |
| Tamol 731A (dispersant) | 0.25 |
| Sodium Phosphate, Monohydrogen (dibasic) (neutral buoyancy additive) | 3.50 |
| Plastic Pigment 730NA (polymeric microspheres) | 65.00 |

EXAMPLE 3

Red

| Component | wt. % |
| --- | --- |
| Deionized Water (dye vehicle) | 39.42 |
| Kathon PFM (preservative) | 0.08 |
| Nuosept 95 (preservative) | 0.30 |
| AMP 95 (pH regulant) | 0.50 |
| FC120 (surfactant) | 0.05 |
| Rhodapex EST30 (surfactant) | 0.25 |
| Potassium Chloride (neutral buoyancy additive) | 4.00 |
| Day-Glo SPL-13N (polymeric particles) | 30.00 |
| Day-Glo SPL-594 (polymeric particles) | 20.00 |
| Hostafine Yellow GR (colorant) | 2.15 |
| Hostafine Rubine F6B (colorant) | 3.25 |

EXAMPLE 4

Orange

| Component | wt. % |
| --- | --- |
| Deionized Water (dye vehicle) | 39.32 |
| Kathon PFM (preservative) | 0.08 |
| Nuosept 95 (preservative) | 0.30 |
| AMP 95 (pH regulant) | 0.50 |
| FC120 (surfactant) | 0.05 |
| Rhodapex EST30 (surfactant) | 0.25 |
| Sodium Phosphate, Monohydrogen (dibasic) (neutral buoyancy additive) | 4.50 |
| Day-Glo SPL-15N (polymeric particles) | 55.00 |

EXAMPLE 5

Orange

| Component | wt. % |
| --- | --- |
| Deionized Water (dye vehicle) | 34.32 |
| Kathon PFM (preservative) | 0.08 |
| Nuosept 95 (preservative) | 0.30 |
| AMP 95 (pH regulant) | 0.50 |
| FC120 (surfactant) | 0.05 |
| Rhodapex EST30 (surfactant) | 0.25 |
| Sodium Phosphate, Monohydrogen (dibasic) (neutral buoyancy additive) | 4.50 |
| Day-Glo SPL-15N (polymeric particles) | 50.00 |
| Aerofix N (dyeblocker) | 10.00 |

EXAMPLE 6

Blue

| Component | wt. % |
| --- | --- |
| Deionized Water (dye vehicle) | 40.5 |
| Palmer Blue (Milliken) (colorant) | 5.0 |
| Sodium Sulfate (anhydrous) (neutral buoyancy additive) | 3.0 |
| Ropaque OP-96 (polymeric microspheres) | 46.7 |
| Tamol 731 (dispersant) | 2.0 |
| Preservatives | 2.8 |

EXAMPLE 7

Red

| Component | wt. % |
| --- | --- |
| Deionized Water (dye vehicle) | 32.5 |
| Red FL 209 (Milliken) (colorant) | 13.0 |
| Sodium Sulfate (anhydrous) (neutral buoyancy additive) | 3.0 |
| Ropaque OP-96 (polymeric microspheres) | 46.7 |
| Tamol 731 (dispersant) | 2.0 |
| Preservatives | 2.8 |

EXAMPLE 8

White

| Component | wt. % |
| --- | --- |
| Deionized Water (dye vehicle) | 30.87 |
| Kathon PFM (preservative) | 0.08 |
| Nuosept 95 (preservative) | 0.30 |
| AMP 95 (pH regulant) | 0.50 |
| Tamol 731A (dispersant) | 0.25 |

| Component | wt. % |
|---|---|
| Potassium Chloride (neutral buoyancy additive) | 3.00 |
| Ropaque OP-96 (polymeric microspheres) | 65.00 |

EXAMPLE 9

White

| Component | wt. % |
|---|---|
| Deionized Water (dye vehicle) | 30.37 |
| Kathon PFM (preservative) | 0.08 |
| Nuosept 95 (preservative) | 0.30 |
| AMP 95 (pH regulant) | 0.50 |
| Tamol 731A (dispersant) | 0.25 |
| Potassium Chloride (neutral buoyancy additive) | 3.50 |
| Plastic Pigment 730NA (polymeric microspheres) | 35.00 |
| Ropaque OP-96 (polymeric microspheres) | 30.00 |

EXAMPLE 10

Yellow

| Component | wt. % |
|---|---|
| Deionized Water (pH regulant) | 35.82 |
| Kathon PFM (preservative) | 0.08 |
| Nuosept 95 (preservative) | 0.30 |
| AMP 95 (pH regulant) | 0.50 |
| FC120 (surfactant) | 0.05 |
| Rhodapex EST30 (surfactant) | 0.25 |
| Potassium Carbonate (neutral buoyancy additive) | 3.00 |
| Ropaque OP-96 (polymeric microspheres) | 20.00 |
| Day-Glo SPL-17N (polymeric particles) | 40.00 |

EXAMPLE 11

Blue

| Component | wt. % |
|---|---|
| Deionized Water (dye vehicle) | 40.62 |
| Acid Blue 9 (colorant) | 2.00 |
| Sodium Sulfate (neutral buoyancy additive) | 2.00 |
| Plastic Pigment 730NA (polymeric microspheres) | 50.00 |
| DCQ43667 (release agent) | 5.00 |
| Preservatives | 0.38 |

EXAMPLE 12

Orange

| Component | wt. % |
|---|---|
| Deionized Water (dye vehicle) | 37.32 |
| Kathon PFM (preservative) | 0.08 |
| Nuosept 95 (preservative) | 0.30 |
| AMP 95 (pH regulant) | 0.50 |
| FC120 (surfactant) | 0.05 |
| Rhodapex EST30 (surfactant) | 0.25 |
| Sodium Phosphate, Monohydrogen (dibasic) (neutral buoyancy additive) | 4.50 |
| Day-Glo SPL-15N (polymeric particles) | 50.00 |
| FF400 (release agent) | 7.00 |

EXAMPLE 13

Yellow

| Component | wt. % |
|---|---|
| Deionized Water (dye vehicle) | 36.9 |
| Palmer Yellow (Milliken) (colorant) | 2.5 |
| Sodium sulfate ($Na_2SO_4 \cdot 10\ H_2O$) (neutral buoyancy additive) | 2.5 |
| Ropaque OP-96 (polymeric microspheres) | 48.3 |
| DCQ43667 (release agent) | 5.0 |
| Tamol 731 (dispersant) | 2.0 |
| Preservatives | 2.8 |

All of the references cited herein, including patents, patent application and publications, are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A water-based coloring composition suitable for use in markers comprising:
   (a) a carrier comprising water;
   (b) submicron polymeric particles; and,
   (c) a neutral buoyancy additive present in an amount sufficient to render the specific gravity of said carrier about equal to or greater than the specific gravity of said polymeric particles.

2. The water-based coloring composition according to claim 1, wherein said submicron polymeric particles are modified with compounds selected from the group consisting of dyes, pigments, and mixtures thereof.

3. The water-based coloring composition according to claim 1, wherein said submicron polymeric particles are solid.

4. The water-based coloring composition according to claim 1, wherein said submicron polymeric particles have an outer polymeric shell which defines an inner hollow region.

5. The water-based coloring composition according to claim 4, wherein the inner hollow region of said submicron polymeric particles contains water.

6. The water-based coloring composition according to claim 5, further comprising solid submicron polymeric particles.

7. The water-based coloring composition according to claim 3, further comprising modified submicron polymeric particles.

8. The water-based coloring composition according to claim 4, further comprising modified submicron polymeric particles.

9. The water-based coloring composition according to claim 1, wherein said submicron polymeric particles are microspheres.

10. The water-based coloring composition according to claim 1, wherein said submicron polymeric particles are present in an amount of from about 5% by weight to about 80% by weight of the coloring composition.

11. The water-based coloring composition according to claim 1, wherein said neutral buoyancy additive is a water-soluble inorganic salt.

12. The water-based coloring composition according to claim 11, wherein said water-soluble inorganic salt is selected from the group consisting of sodium sulfate, sodium chloride, sodium phosphate, and potassium chloride.

13. The water-based coloring composition according to claim 1, wherein said neutral buoyancy additive is a water-soluble organic compound.

14. The water-based coloring composition according to claim 13, wherein said water-soluble organic compound is selected from the group consisting of sugar, starch, glycerin, organic salt, and mixtures thereof.

15. The water-based coloring composition according to claim 1, wherein said coloring composition has a density of about 8.0 lbs/gal to about 9.0 lbs/gal.

16. The water-based coloring composition according to claim 15, wherein said neutral buoyancy additive is present in an amount of from about 0.5% to about 30% by weight of the coloring composition.

17. The water-based coloring composition according to claim 15, wherein said coloring composition has a viscosity of from about 1 to about 20 centipoises.

18. The water-based coloring compositions according to claim 15, further comprising a release agent.

19. The water-based coloring compositions according to claim 15, further comprising a colorant.

20. The water-based coloring composition according to claim 15, further comprising a dispersing agent.

21. The water-based coloring composition according to claim 15, further comprising an anionic dyeblocker in an amount sufficient to enhance the fugitivity of said compositions from skin.

22. The water-based coloring composition according to claim 21, wherein said anionic dyeblocker is an aromatic organic sulfonate.

23. The water-based coloring composition according to claim 22, wherein said aromatic organic sulfonate is selected from the group consisting of a sulfonated phenol-formaldehyde condensation product, a naphthalene condensation product, and mixtures thereof.

24. A water-based dry erase coloring composition suitable for use in markers comprising:
   (a) a carrier comprising water;
   (b) submicron polymeric particles;
   (c) a neutral buoyancy additive present in an amount sufficient to render the specific gravity of said carrier about equal to or greater than the specific gravity of said polymeric particles; and,
   (d) a release agent.

25. A marking instrument for applying a coloring composition comprising a nib and a reservoir wherein said reservoir contains a water-based coloring composition comprising:
   (a) a carrier comprising water;
   (b) submicron polymeric particles; and,
   (c) a neutral buoyancy additive present in an amount sufficient to render the specific gravity of said carrier about equal to or greater than the specific gravity of said polymeric particles.

* * * * *

UNITED STATES PATENT AND TRADEMARK OFFICE
CERTIFICATE OF CORRECTION

PATENT NO. : 6,174,938 B1
DATED : January 16, 2001
INVENTOR(S) : Miller et al.

Page 1 of 1

It is certified that error appears in the above-identified patent and that said Letters Patent is hereby corrected as shown below:

Title page,
Second column, under "Foreign Patent Documents" "63-273679" should read -- 63-273678 --

Column 18, claim 18,
Line 11, "compositions" should read -- composition --

Column 18, claim 19,
Line 13, "compositions" should read -- composition --

Column 18, claim 23,
Line 26, "is 10" should read -- is --

Signed and Sealed this

Ninth Day of October, 2001

Attest:

*Nicholas P. Godici*

Attesting Officer

NICHOLAS P. GODICI
*Acting Director of the United States Patent and Trademark Office*